US010038807B2

(12) United States Patent
Saitoh et al.

(10) Patent No.: US 10,038,807 B2
(45) Date of Patent: Jul. 31, 2018

(54) IMAGE DISPLAY APPARATUS, IMAGE FORMING APPARATUS, AND NON-TRANSITORY COMPUTER READABLE MEDIUM FOR PERFORMING A CHANGE PROCESS ON AN IMAGE

(71) Applicant: FUJI XEROX CO., LTD., Tokyo (JP)

(72) Inventors: Ryoko Saitoh, Kanagawa (JP); Yuichi Kawata, Kanagawa (JP); Hideki Yamasaki, Kanagawa (JP); Yoshifumi Bando, Kanagawa (JP); Kensuke Okamoto, Kanagawa (JP); Tomoyo Nishida, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/445,398

(22) Filed: Feb. 28, 2017

(65) Prior Publication Data

US 2018/0034996 A1    Feb. 1, 2018

(30) Foreign Application Priority Data

Jul. 29, 2016   (JP) ................................ 2016-150473

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ..... *H04N 1/00925* (2013.01); *H04N 1/00251* (2013.01); *H04N 1/00381* (2013.01); *H04N 1/00411* (2013.01); *H04N 1/00469* (2013.01); *H04N 2201/0081* (2013.01); *H04N 2201/0082* (2013.01)

(58) Field of Classification Search
CPC .......... H04N 1/00912; H04N 1/00336; H04N 1/00411; H04N 1/00469; H04N 1/00474; H04N 2201/0081; H04N 2201/0082
USPC ......................... 358/1.1, 1.15, 1.13, 1.14, 1.6
See application file for complete search history.

(56) References Cited

U.S. PATENT DOCUMENTS

2011/0254865 A1   10/2011  Yee et al.
2015/0138232 A1*   5/2015  Sugimoto ............. G06F 3/1205
                                                      345/633
2017/0310956 A1*  10/2017  Perdices-
                                          Gonzalez ........... H04N 13/0497

FOREIGN PATENT DOCUMENTS

JP    H10-320109 A    12/1998
JP    2015-097123 A    5/2015

* cited by examiner

*Primary Examiner* — Douglas Tran
(74) *Attorney, Agent, or Firm* — Oliff PLC

(57) ABSTRACT

An image display apparatus includes an image display, a receiving unit, a detection section, and a change processing section. The image display displays an image. The receiving unit receives an operation performed by a user on information displayed on the image display. The detection section detects a user's finger approaching the receiving unit or an operation performed by the user on the receiving unit. The change processing section performs a change process on the image displayed on the image display, and stops or does not perform the change process when the detection section detects the approaching or the operation.

8 Claims, 7 Drawing Sheets

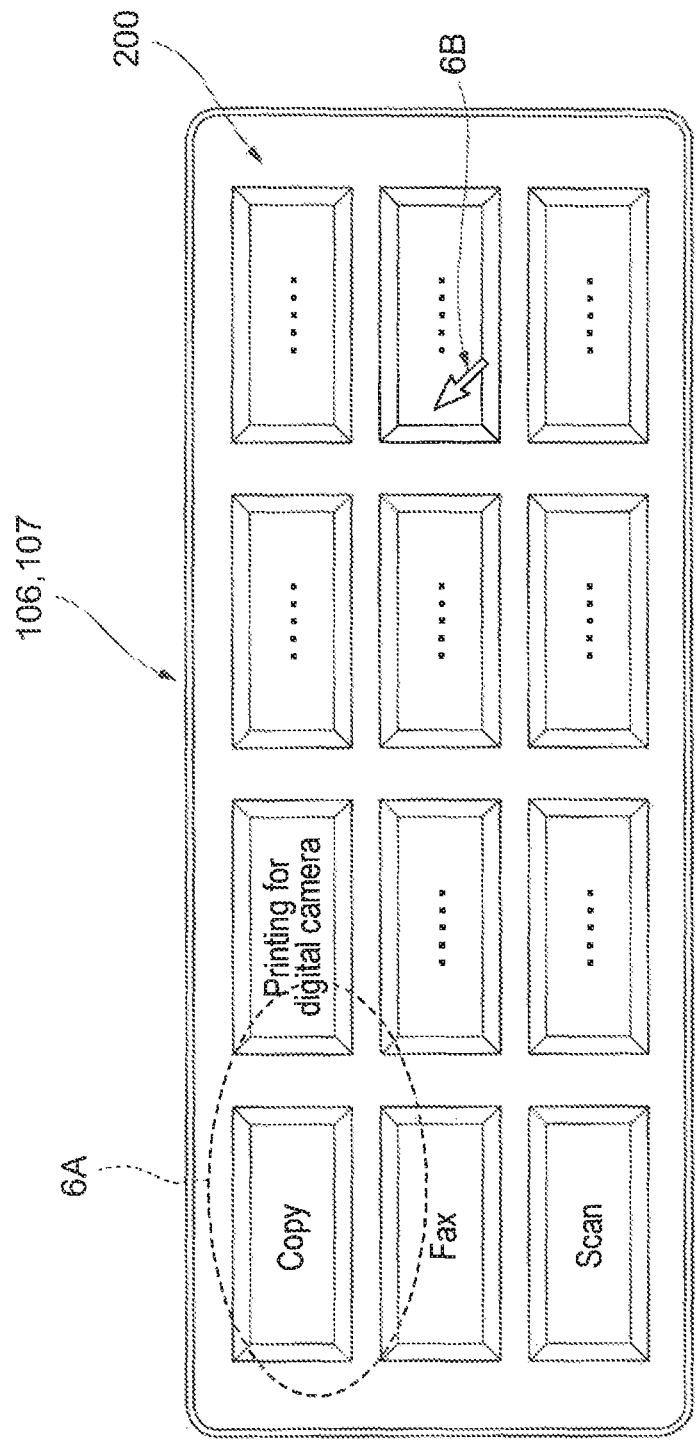

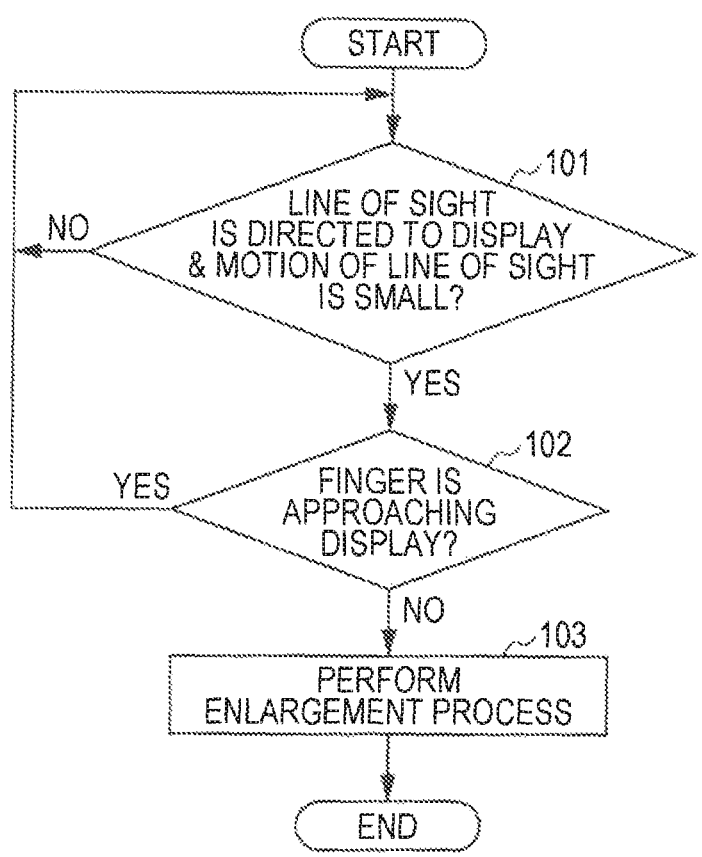

IMAGE DISPLAY APPARATUS, IMAGE FORMING APPARATUS, AND NON-TRANSITORY COMPUTER READABLE MEDIUM FOR PERFORMING A CHANGE PROCESS ON AN IMAGE

CROSS-REFERENCE TO RELATED APPLICATIONS

This application is based on and claims priority under 35 USC 119 from Japanese Patent Application No. 2016-150473 filed Jul. 29, 2016.

BACKGROUND

Technical Field

The present invention relates to an image display apparatus, an image forming apparatus, and a non-transitory computer readable medium.

SUMMARY

According to an aspect of the invention, there is provided an image display apparatus including an image display, a receiving unit, a detection section, and a change processing section. The image display displays an image. The receiving unit receives an operation performed by a user on information displayed on the image display. The detection section detects a user's finger approaching the receiving unit or an operation performed by the user on the receiving unit. The change processing section performs a change process on the image displayed on the image display, and stops or does not perform the change process when the detection section detects the approaching or the operation.

BRIEF DESCRIPTION OF THE DRAWINGS

Exemplary embodiments of the present invention will be described in detail based on the following figures, wherein:

FIG. 6 is a diagram illustrating an exemplary display screen displayed on a display; and FIG. 7 is a flowchart illustrating the flow of a process performed by the image forming apparatus.

DETAILED DESCRIPTION

Exemplary embodiments of the present invention will be described below in detail with reference to the attached drawings.

Figure 1:
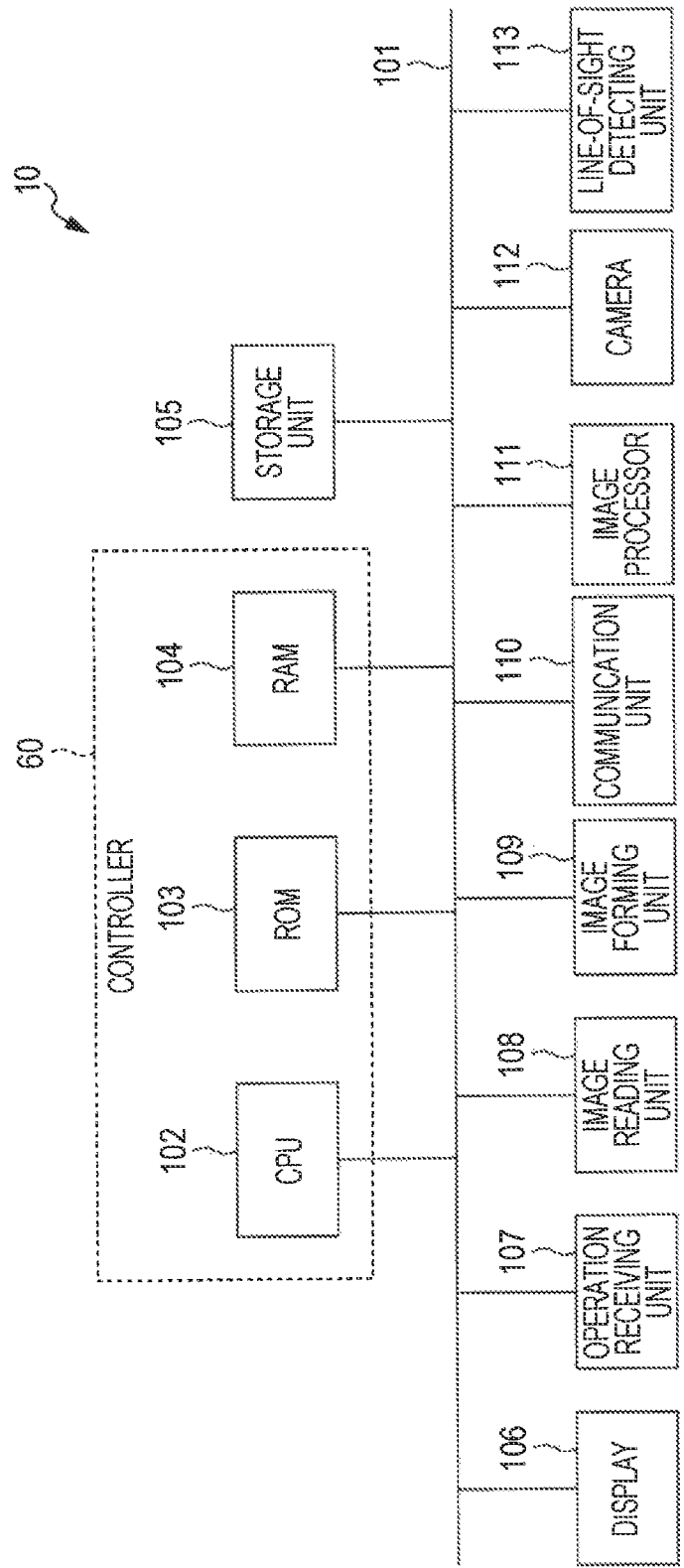
FIG. 1 is a diagram illustrating an image forming apparatus.

FIG. 1 is a diagram illustrating an image forming apparatus 10 according to an exemplary embodiment.

As illustrated in FIG. 1, the functional units that are included in the image forming apparatus 10 according to the exemplary embodiment and that are connected to a bus 101 transmit/receive data via the bus 101.

A display 106, which serves as an exemplary image display, displays data about the image forming apparatus 10. The display 106 displays multiple options (selection buttons) that are to be selected by a user when the user operates the image forming apparatus 10.

An operation receiving unit 107, which serves as an exemplary receiving unit, receives operations from a user.

Specifically, the operation receiving unit 107 receives user operations performed on information displayed on the display 106. More specifically, in the exemplary embodiment, the operation receiving unit 107 receives user selection of the multiple options displayed on the display 106.

The display 106 and the operation receiving unit 107 are formed by using a touch panel display, and the operation receiving unit 107 and the display 106 are disposed so that the operation receiving unit 107 is superposed on the display 106.

Herein, the case in which the operation receiving unit 107 is formed as a touch panel display is described. However, the operation receiving unit 107 may be formed as a pointing device such as a mouse.

In this case, when a user operates the pointing device, a pointer displayed on the display 106 is moved. When the user is to select an option, the pointer is positioned on the option, and a user operation (an operation such as a click) is performed on the pointing device.

The display 106 is controlled by a controller 60. In the exemplary embodiment, the operation receiving unit 107 receives a user operation on information displayed on the display 106. In the exemplary embodiment, a process corresponding to the operation is performed in accordance with the user operation received by the operation receiving unit 107. In addition, the information displayed on the display 106 is changed in accordance with the user operation received by the operation receiving unit 107.

The controller 60, the display 106, the operation receiving unit 107, and the like are functional units related to display of an image. These may be regarded as functional units included in an image display apparatus.

An image reading unit 108 formed by using a so-called scanner apparatus reads an image on a document that has been set, and generates a read image (image data) of the document.

An image forming unit 109, which serves as an exemplary image forming section, uses, for example, an electrophotographic system to form a toner image according to image data, on a sheet of paper which is exemplary recording material. The image forming unit 109 may form an image by using another system such as an inkjet head system.

A communication unit 110 connected to a communication line (not illustrated) serves as a communication interface that communicates with other apparatuses connected to the communication line.

An image processor 111 performs image processing, such as color correction and gradation correction, on an image represented by image data.

A camera 112 photographs the condition of the surrounding area of the image forming apparatus 10. The camera 112 also photographs a user when the user stands in front of the image forming apparatus 10.

Figure 2:
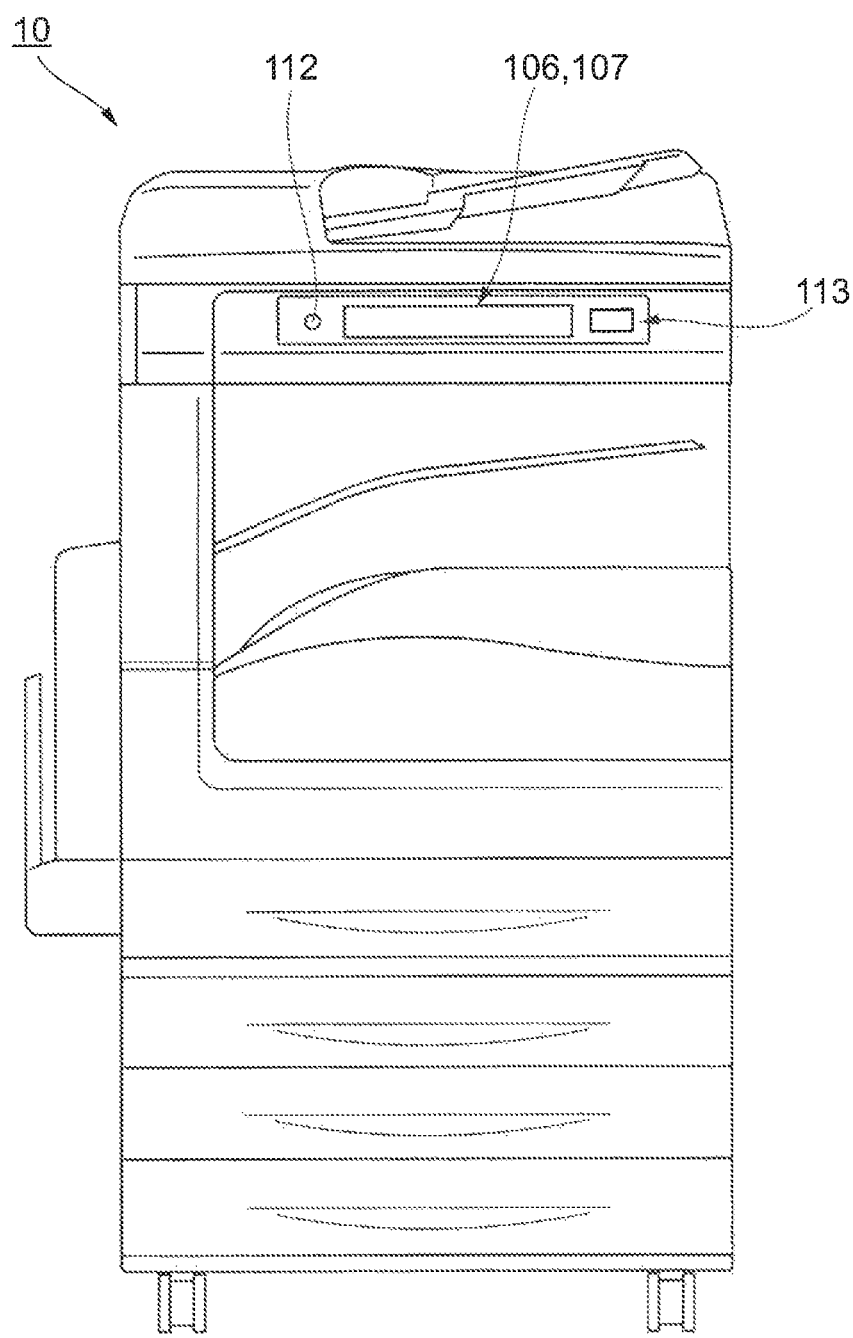
FIG. 2 is a view obtained when the image forming apparatus is viewed from the front.

The camera 112 includes a charge coupled device (CCD). As illustrated in FIG. 2 (a view obtained when the image forming apparatus 10 is viewed from the front), the camera 112 is disposed on the front of the image forming apparatus 10. In addition, the camera 112 is disposed beside the display 106 (the operation receiving unit 107).

A line-of-sight detecting unit 113 (see FIG. 1) detects the line of sight of a user who operates the image forming apparatus 10.

As illustrated in FIG. 2, the line-of-sight detecting unit 113 is also disposed on the front of the image forming apparatus 10. In addition, the line-of-sight detecting unit 113 is disposed beside the display 106 (the operation receiving unit 107).

A storage unit 105 (see FIG. 1) is formed by using a storage device such as a hard disk device. For example, the storage unit 105 stores data received by the communication unit 110 and also stores read images (image data) generated by the image reading unit 108.

The controller 60 controls the units of the image forming apparatus 10. The controller 60 includes a central processing unit (CPU) 102, a read only memory (ROM) 103, and a random access memory (RAM) 104.

The ROM 103 is used to store programs executed by the CPU 102. The CPU 102 reads programs stored in the ROM 103, and uses the RAM 104 as a work area to execute the programs.

When the CPU 102 executes programs, the CPU 102 controls the units of the image forming apparatus 10. Thus, for example, the image forming apparatus 10 forms an image on a sheet of paper and reads a document to generate a read image for the document.

Figure 3:
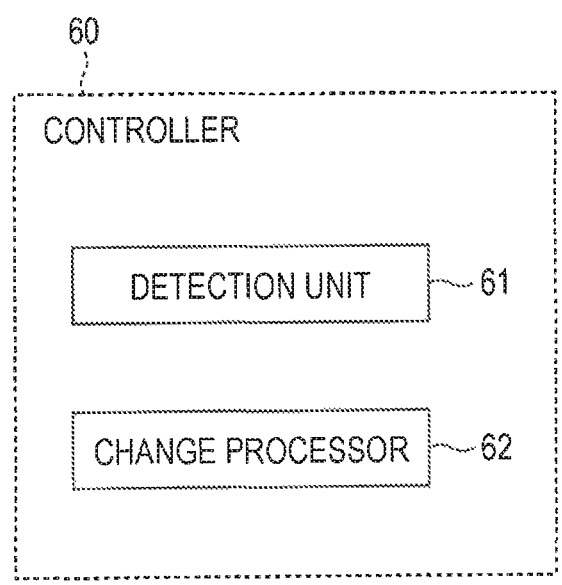
FIG. 3 is a block diagram illustrating the functional configuration of a controller.

In the exemplary embodiment, the CPU 102 executes programs. Thus, as illustrated in FIG. 3 (a block diagram illustrating the functional configuration of the controller 60), the controller 60 serves as a detection unit 61 which serves as an exemplary detection section.

The detection unit 61 detects a user's finger approaching the operation receiving unit 107 (the display 106) (see FIG. 2) or a user operation performed on the operation receiving unit 107.

Specifically, the detection unit 61 detects a user's finger approaching the operation receiving unit 107, on the basis of an image obtained through photographing using the camera 112.

When the operation receiving unit 107 is formed by using a pointing device, the detection unit 61 detects a user operation performed on the operation receiving unit 107, on the basis of output from the pointing device.

In the exemplary embodiment, by executing programs by the CPU 102, the controller 60 serves as a change processor 62 (see FIG. 3) which serves as an exemplary change processing section.

The change processor 62 changes an image displayed on the display 106 (see FIG. 2). When the detection unit 61 detects a user's finger approaching the display 106 or a user operation on the pointing device, the change processor 62 stops (interrupts) this change process, or does not perform the change process (cancels the change process).

Programs executed by the CPU 102 may be provided for the image forming apparatus 10 in such a manner that the programs are stored in a computer-readable recording medium, such as a magnetic recording medium (a magnetic tape, a magnetic disk, or the like), an optical recording medium (an optical disk or the like), a magneto-optical recording medium, or a semiconductor memory.

Programs executed by the CPU 102 may be downloaded to the image forming apparatus 10 by using a communication unit such as the Internet.

Figure 4:
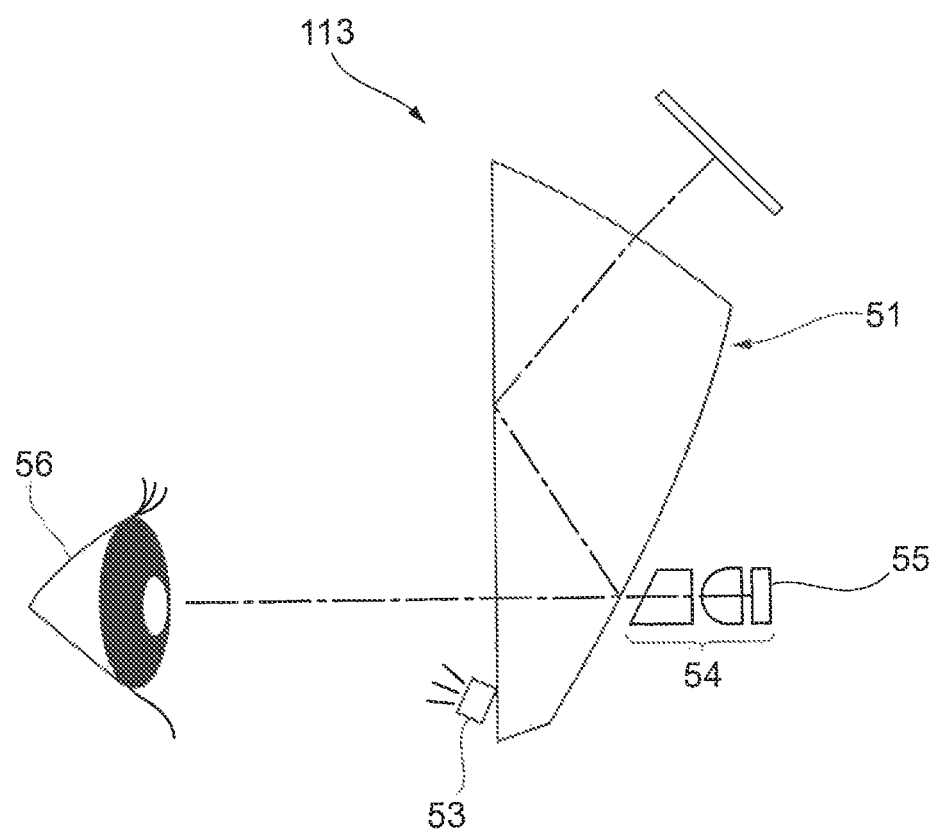
FIG. 4 is a diagram for describing the configuration of a line-of-sight detecting unit.
Figure 5A:
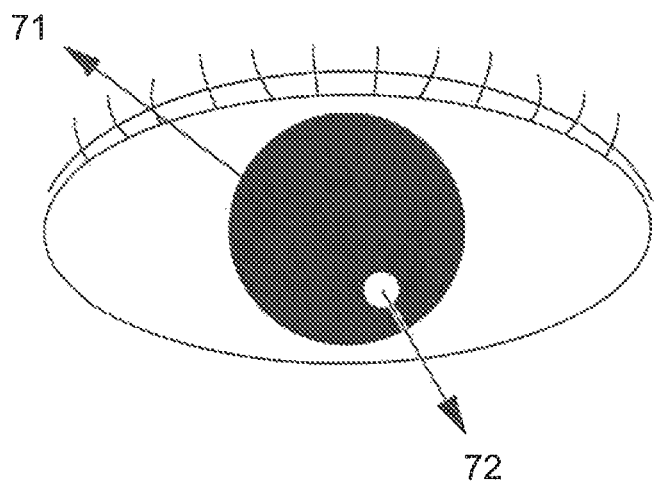
FIGS. 5A and 5B are diagrams for describing the configuration of the line-of-sight detecting unit.
Figure 5B:
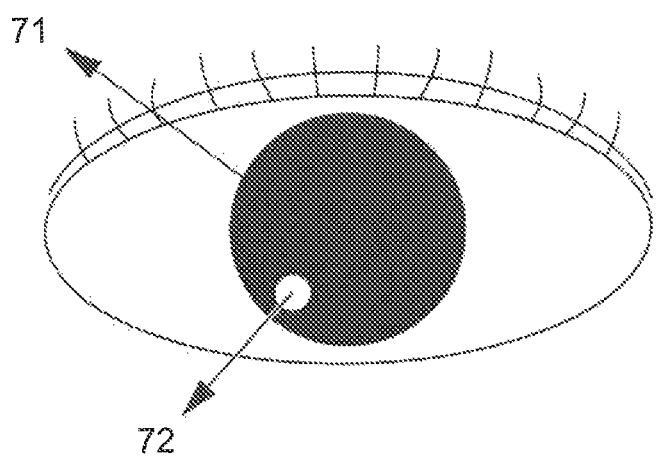

FIG. 4 and FIGS. 5A and 5B are diagrams for describing the configuration of the line-of-sight detecting unit 113.

As illustrated in FIG. 4, the line-of-sight detecting unit 113 includes a light source 53 that emits infrared spot light to user's eyeball 56. The infrared light reflected from the eyeball 56 enters an optical lens set 54 via a fine aperture stop provided for an eyepiece 51. The optical lens set 54 causes the infrared reflected incident light to converge, for image formation, to a spot on the imaging surface of a CCD 55. The CCD 55 converts, for output, a virtual image (Purkinje image) that is formed on the imaging surface and that is produced by the corneal reflection, into an electric signal.

As illustrated in FIGS. 5A and 5B, the virtual image is a virtual image 72 that is produced by the corneal reflection in which the infrared light emitted from the light source 53 is reflected at a pupil 71. A relative positional relationship between the center of the pupil 71 and the virtual image 72 changes proportionately with the rotation angle of the eyeball. In the exemplary embodiment, the electric signal which indicates the virtual image and which is transmitted from the CCD 55 is used to perform image processing. On the basis of the result of the image processing, the direction of user's gaze is detected.

The method of detecting the direction of user's gaze is not limited to the method illustrated in FIGS. 4 to 5B. Another known method may be used.

FIG. 6 is a diagram illustrating an exemplary display screen displayed on the display 106.

The image forming apparatus 10 according to the exemplary embodiment is provided with functions, such as an image reading function and an image output function (print function).

On the display screen displayed on the display 106, multiple options 200 (selection buttons) related to these functions are displayed. Specifically, in the exemplary embodiment, twelve options 200 are displayed.

In the exemplary embodiment, as described above, the line-of-sight detecting unit 113 is provided. In the exemplary embodiment, the detection unit 61 grasps which portion of a displayed image displayed on the display 106 is being viewed by a user who operates the image forming apparatus 10, on the basis of output from the line-of-sight detecting unit 113. In this example, the detection unit 61 grasps that the user is viewing a portion indicated by the reference character 6A in FIG. 6. In other words, in this case, the user is gazing at the portion indicated by the reference character 6A.

In the exemplary embodiment, when a user is thus gazing at a portion of a displayed image, the change processor 62 enlarges the portion. Thus, the portion on which the user is focusing is enlarged, and the display is more easily viewed by the user.

In contrast, in the exemplary embodiment, when a predetermined condition is satisfied (when a user operation is highly likely to be performed), the change processor 62 stops (interrupts) the change process, or does not perform (cancels) the change process when the change process has not been performed yet.

FIG. 7 is a flowchart illustrating the flow of a process performed by the image forming apparatus 10 according to the exemplary embodiment.

In the exemplary embodiment, the detection unit 61 (see FIG. 3) determines whether or not the line of sight of a user is directed to the display 106 and motion of the line of sight is small (whether or not the amount of movement of the line of sight is within a predetermined range), on the basis of output from the line-of-sight detecting unit 113 (see FIG. 1) (step 101).

If the detection unit 61 determines that the line of sight is not directed to the display 106 or determines that the motion of the line of sight is large, the detection unit 61 performs the process in step 101 again.

In contrast, if the detection unit 61 determines that the line of sight is directed to the display 106 and the motion of the line of sight is small in step 101, the detection unit 61 determines whether or not a user's finger is approaching the display 106 (step 102). The detection unit 61 determines whether or not a user's finger is approaching the display 106 on the basis of output from the camera 112 (see FIG. 2).

In step 102, if it is determined that a user's finger is not approaching the display 106, the change processor 62 enlarges a portion (a portion which is being viewed by the user and which is hereinafter referred to as a "gaze portion") to which the user's line of sight is directed and which is a portion of the display screen on the display 106 (step 103).

In contrast, in step 102, if it is determined that a user's finger is approaching the display 106, the change processor 62 cancels the process in step 103. In other words, the change processor 62 does not perform the enlargement process on the gaze portion. In the exemplary embodiment, in this case, processes of step 101 and subsequent steps are performed again.

If the enlargement process is uniformly performed independently of a user action, when the user is to perform an operation on the display 106 (when the user is to select an option 200 positioned in the gaze portion), the enlargement process may be performed. In this case, the option 200 that the user is going to select is moved. Conversely, user operability may be decreased.

Therefore, in the exemplary embodiment, when a user's finger is approaching the display 106 (when the user is highly likely to perform an operation on the display 106), the enlargement process is not performed.

In the case where the operation receiving unit 107 is formed by using a pointing device, when a user operation on the pointing device is detected, a process of causing the enlargement process to be stopped is performed. That is to say, when the detection unit 61 detects a user operation on the pointing device, the enlargement process is not performed.

Similarly, when the pointing device is operated, the user may select an option 200. In this case, if the enlargement process is performed, user operability may be reduced. When a user operation on the pointing device is detected, the enlargement process is not performed. Thus, reduction in user operability may be suppressed.

As described above, when a user's finger is approaching the display 106, the enlargement process is not performed. When a user's finger is approaching the display 106, the enlargement process which has been already started may be stopped (interrupted).

More specifically, in the exemplary embodiment, the enlargement process is performed in step 103. After the enlargement process is started, a user's finger may approach the display 106. In this case, the enlargement process which has already started may be stopped (interrupted).

As described above, the case in which, when a user's finger is approaching the display 106, the enlargement process is stopped or canceled is described. In the case where a user's finger is approaching the display 106 and where the finger is moving to the gaze portion, the enlargement process may be stopped or canceled.

In this case, when an option 200 positioned in the gaze portion is more highly likely to be selected by the user, the enlargement process is stopped and canceled.

The detection unit 61 determines whether or not a finger is approaching the gaze portion, and the detection unit 61 specifies the gaze portion on the basis of the detection result from the line-of-sight detecting unit 113. Further, the detection unit 61 determines whether or not the finger is approaching the gaze portion on the basis of the result obtained through photographing using the camera 112 (a finger motion photographed by the camera 112).

The same is true for a pointing device. In the case where an operation is performed on the pointing device, and where the pointer moving in accordance with a user operation on the pointing device is moving to the gaze portion, the enlargement process may be stopped or canceled.

FIG. 6 illustrates a pointer (see the reference character 6B). When the pointer is moving to the gaze portion (the portion indicated by the reference character 6A), the enlargement process may be stopped or canceled.

Similarly, in this case, the detection unit 61 determines whether or not the pointer is moving to the gaze portion, and the detection unit 61 specifies the gaze portion on the basis of the detection result from the line-of-sight detecting unit 113. Further, the detection unit 61 determines whether or not the pointer is moving to the gaze portion on the basis of information that is output from the pointing device (position information of the pointer).

Others

As described above, the process of enlarging a gaze portion is described. The enlargement process may be performed, not on the basis of the line of sight of a user. For example, when a predetermined time has elapsed after the display screen is displayed, a portion of the display screen is enlarged. Thus, the enlargement process may be performed in accordance with an elapsed time.

Similarly, in this case, in response to, for example, a user's finger approaching the display 106, the enlargement process is stopped or canceled. Thus, occurrence of the enlargement process performed, for example, when a user is going to select an option 200 may be suppressed.

As described above, the case in which a portion of the display screen is enlarged is described as an exemplary process of changing the display screen. The process of changing a display screen is not limited to the enlargement process. Examples of the process of changing a display screen include a scrolling process and a process of switching the entire screen to another screen.

Similarly, in execution of these processes, in response to, for example, a user's finger approaching the display 106, the change process is stopped or canceled. Thus, occurrence of the change process performed, for example, when a user is going to select an option 200 may be suppressed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image apparatus comprising:
an image display that displays an image;
a receiving unit that receives an operation performed by a user on information displayed on the image display; and
a processor configured to act as:
a detection section that detects a user's finger approaching the receiving unit; and
a change processing section that performs a change process on the image displayed on the image display, wherein when the detection section detects the approaching of the user's finger, the change procession section stops or does not perform the change process,
wherein the change processing section performs an enlargement process on a portion of the image displayed on the image display, and stops or does not perform the enlargement process when the detection section detects the approaching.

2. The image apparatus according to claim 1,
wherein the change processing section performs the enlargement process on the portion of the image displayed on the image display, the portion being viewed by the user.

3. The image apparatus according to claim 1,
wherein the change processing section stops or does not perform the enlargement process if the user's finger approaching the image display is detected and if the finger is moving to the portion that is to be enlarged.

4. The image apparatus according to claim 2,
wherein the change processing section stops or does not perform the enlargement process if the user's finger approaching the image display is detected and if the finger is moving to the portion that is to be enlarged.

5. The image apparatus according to claim 1,
wherein the receiving unit receives the operation performed by the user on the information displayed on the image display, the operation being obtained when the user moves a pointer displayed on the image display, and
wherein the change processing section stops or does not perform the enlargement process if the operation performed by the user on the receiving unit is detected and if the pointer is moving to the portion that is to be enlarged.

6. The image apparatus according to claim 2,
wherein the receiving unit receives the operation performed by the user on the information displayed on the image display, the operation being obtained when the user moves a pointer displayed on the image display, and
wherein the change processing section stops or does not perform the enlargement process if the operation performed by the user on the receiving unit is detected and if the pointer is moving to the portion that is to be enlarged.

7. An image forming apparatus comprising:
an image apparatus that displays an image; and
an image forming section that forms an image on recording material,
wherein the image apparatus is the image apparatus according to claim 1.

8. A non-transitory computer readable medium storing a program causing a computer to execute a process, the computer included in an image apparatus, the image apparatus including an image display that displays an image and a receiving unit that receives an operation performed by a user on information displayed on the image display, the process comprising:
detecting a user's finger approaching the receiving unit; and
performing a change process on the image displayed on the image display, and when the detection of the user's finger occurs, stopping or not performing the change process,
wherein the performing of the change process includes performing an enlargement process on a portion of the image displayed on the image display, and stops or does not perform the enlargement process when the detection detects the approaching.

* * * * *